United States Patent
Cook

(10) Patent No.: US 7,426,864 B2
(45) Date of Patent: Sep. 23, 2008

(54) GAUGE WITH DUAL SCALE

(75) Inventor: David M Cook, Plymouth, MI (US)

(73) Assignee: DENSO International America, Inc., Southfield, MI (US)

( * ) Notice: Subject to any disclaimer, the term of this patent is extended or adjusted under 35 U.S.C. 154(b) by 409 days.

(21) Appl. No.: 11/360,621

(22) Filed: Feb. 23, 2006

(65) Prior Publication Data

US 2007/0193356 A1    Aug. 23, 2007

(51) Int. Cl.
*G01P 3/00* (2006.01)
(52) U.S. Cl. .................. 73/528; 116/62.1; 116/284; 116/286; 116/289
(58) Field of Classification Search .............. 73/528; 116/62.1, 286, 289, 292, 295
See application file for complete search history.

(56) References Cited

U.S. PATENT DOCUMENTS 3,807,350 A * 4/1974 Powell ..................... 116/300
3,926,142 A * 12/1975 Okamoto ................. 116/62.2
5,033,402 A * 7/1991 Peet, II ..................... 116/292
D441,676 S * 5/2001 Kouchi et al. ............. D10/103
6,718,906 B2 * 4/2004 Quigley et al. ............ 116/62.4
6,981,464 B2 * 1/2006 Birman et al. ............. 116/288
2003/0221606 A1 * 12/2003 Quigley et al. ............ 116/286

FOREIGN PATENT DOCUMENTS

JP    2003215142 A  *  7/2003

* cited by examiner

*Primary Examiner*—Hezron E. Williams
*Assistant Examiner*—Samir M. Shah
(74) *Attorney, Agent, or Firm*—Harness, Dickey & Pierce, PLC

(57) ABSTRACT

A gauge of a vehicle instrument cluster includes a gauge defining a dial. A pointer is rotatably mounted in the instrument cluster and movable to a plurality of positions relative to the dial. A first scale of numbers is arranged sequentially around the dial and corresponds to a first range of vehicle speed. A second scale of numbers is arranged sequentially around the dial and corresponds to a second range of vehicle speed. The second scale of numbers corresponds to vehicle speeds that are faster than the first range of vehicle speeds and have like units. The first scale and the second scale of numbers are arranged in a radially offset relationship.

20 Claims, 2 Drawing Sheets

GAUGE WITH DUAL SCALE

FIELD OF THE INVENTION

The present invention relates generally to vehicle instrument clusters and, more particularly, to an instrument cluster gauge incorporating a dual scale.

BACKGROUND OF THE INVENTION

Instrument clusters on automobiles generally include a plurality of gauges for displaying such operational information such as vehicle speed, engine RPM, engine temperature, fuel level and many other information. The gauges may include analog or digital readings for displaying the information depending on manufacturer and styling preferences. An analog gauge typically includes a faceplate having indicia thereon such as numbers and a pointer for rotating to the appropriate number.

One important design consideration for an instrument cluster and related gauges is the ability of a vehicle operator to easily view and read the gauges in all driving environments. One aspect to consider when designing an instrument cluster gauge is to provide numbers that may be easily viewed by the operator. In some examples however, such as for a speedometer, it may be desirable to provide a large range of numbers, which may reduce the overall size of the displayed numbers. For example, some speedometers may need to display a large scale of miles per hour (MPH). In one example, a speedometer may display a range from 0 to 160 MPH or higher (or 0 to 260 kilometers per hour or higher). In some instances, it may be difficult to provide such a large range of numbers in a manner that is easily viewable.

SUMMARY OF THE INVENTION

A viewed component of a vehicle instrument cluster includes a gauge defining a dial. A pointer is rotatably mounted in the instrument cluster and movable to a plurality of positions relative to the dial. A first scale of numbers is arranged sequentially around the dial and corresponds to a first range of vehicle speed. A second scale of numbers is arranged sequentially around the dial and corresponds to a second range of vehicle speed. The second scale of numbers corresponds to vehicle speeds that are faster than the first range of vehicle speeds and have like units. The first scale and the second scale of numbers are arranged in a radially offset relationship.

According to other features, the pointer is adapted to rotate from a first position corresponding to a first starting point on the first scale of numbers to a position corresponding to a break point at an end of the first scale of numbers. When the vehicle speed exceeds the break point, the pointer is adapted to rotate to the first position corresponding to a second starting point on the second scale of numbers. A motor is adapted to advance the pointer from the break point to the first position. In one example, the first scale of numbers are located inboard from the second scale of numbers. The first scale of numbers is illuminated when the vehicle is traveling within the first range of speed. The second scale of numbers is illuminated when the vehicle is traveling within the second range of speed.

According to other features, the second scale of numbers is arranged sequentially counterclockwise around the dial. The pointer may be adapted to rotate in a clockwise direction from a first position corresponding to a first starting point on the first scale of numbers to a position corresponding to a break point at the end of the first scale of numbers. When the vehicle speed exceeds the break point, the pointer may be adapted to rotate in a counterclockwise direction from the break point corresponding to a second starting point on the second scale of numbers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
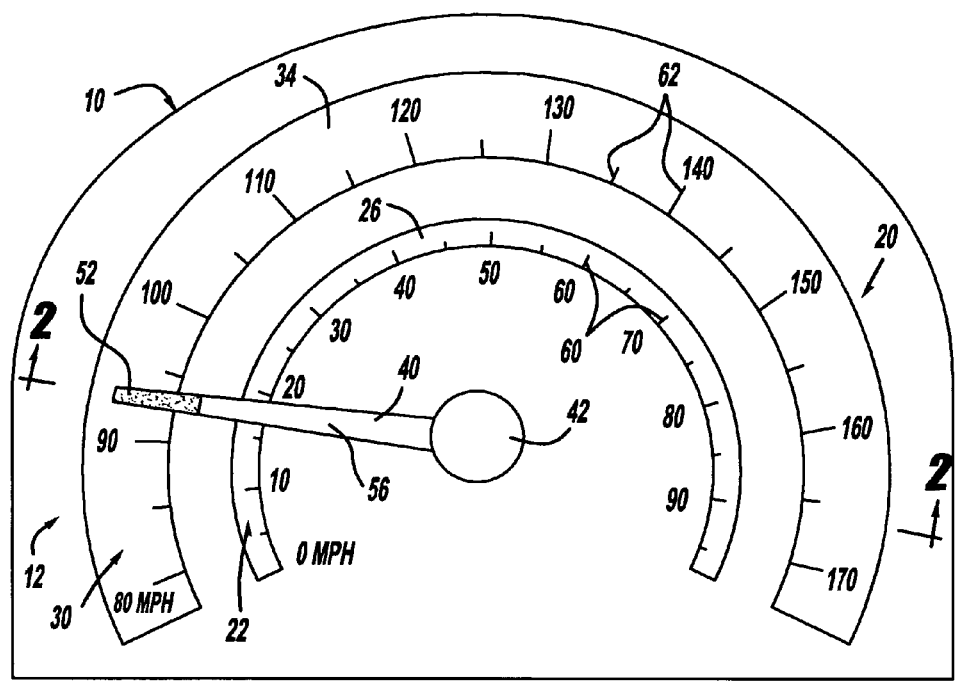
FIG. 1 is a front view of a vehicle speedometer according to teachings of the invention.

FIG. 1 depicts an exemplary instrument cluster 10 in an automotive vehicle. The instrument cluster 10 may include various gauges and dials which are to be viewed and/or operated by an occupant of the vehicle. For example, a speedometer 12 may be used to display the speed at which a vehicle is traveling. The speedometer 12 includes a movable pointer 14 which correlates to the speed of the vehicle. To provide meaningful graphical information to the occupant, a dial or faceplate 20 of the speedometer 12 forms the background for the pointer 14 of the speedometer 12. While the following discussion is specifically directed toward a speedometer, it is appreciated that the same may be applied to other gauges such as, but not limited to, a tachometer for example.

The speedometer 12 according to the present teachings provides a first scale of numbers 22 arranged sequentially around the faceplate 20 corresponding to a first range of vehicle speeds. The first scale of numbers 22 may be arranged adjacent a first band of graphics 26. A second scale of numbers 30 may be arranged sequentially around the faceplate 20 and correspond to a second range of vehicle speeds. The second scale of numbers 30 may be arranged within a second band of graphics 34. In one example, the first and second scales of numbers 22 and 30, respectively, are radially offset. In the exemplary speedometer 12, English units (miles per hour, MPH) are shown. It is appreciated however that metric units (such as kilometers per hour, KPH) may be used.

Figure 2:
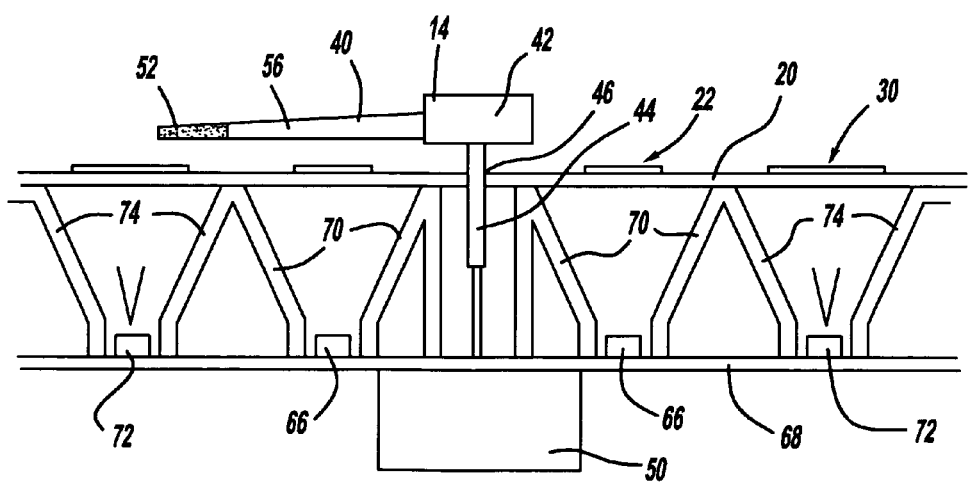
FIG. 2 is a cross-sectional view of FIG. 1 taken along line 2-2.

With continued reference to FIG. 1 and further reference to FIG. 2, the pointer 14 may define a generally longitudinal portion 40 extending from a hub 42. The hub 42 may define a stem 44 extending through a passage 46 in the faceplate 20. The stem 44 may be coupled for rotatable movement with a motor 50. In one example, the pointer 14 may define a shaded or opaque tip portion 52. The opaque tip portion 52 may be configured to align or overlay the second scale of numbers 30. It is appreciated that the tip portion 52 may have other configurations. In one example, numerals in the first scale of numbers 22 may be a bright color such as white while the first band of graphics 26 may be a dark color such as black for example. The pointer 14 may be illuminated along an intermediate portion 56. A first and second series of grad lines 60 and 62 may be provided on the first and second band of graphics 26 and 34, respectively. In another example, common grad lines may be used for both the first and second scales of numbers 22 and 30.

A first series of light sources 66 may extend from a printed circuit board 68 for directing light through a first series of respective chimneys 70 and through the faceplate 20. Similarly a second series of light sources 72 may extend from the printed circuit board for directing light through a second series of respective chimneys 74 and through the faceplate 20. The first series of light sources 66 are aligned with the first scale of numbers 22 while the second series of light sources 72 are aligned with the second scale of numbers 30. The respective first and second series of light sources 66, 72 may comprise any suitable light emitting source for use in an instrument cluster such as, but not limited to a light bulb or light emitting diode.

As will become appreciated from the following discussion, the speedometer 12 is adapted to rotate clockwise around the dial 20 in a first mode corresponding to the first scale of numbers 22. Once the vehicle speed exceeds a break or limit of the first scale of numbers 22, the pointer 14 quickly advances to a position corresponding to the beginning of the second scale of numbers 30. The pointer 14 then may continue to rotate clockwise around the dial 20 pointing to the second scale of numbers 30. In one example, the first scale of numbers 22 are illuminated during operation in the first mode and the second scale of numbers 30 are illuminated during operation in the second mode.

Operation of the speedometer 12 will now be described in greater detail. For purposes of discussion, a sweep of the pointer 14 through MPH ranges of 0 MPH to 90 MPH will be referred to as the first mode and a sweep of the pointer 14 through MPH ranges of 90 MPH to 180 MPH will be referred to as a second mode. Of note, the first and second scales of numbers 22 and 30 may have overlap. In the exemplary speedometer 12 shown, the first scale of numbers end at 90 MPH while the second scale of numbers 30 begins at 80 MPH. As will become appreciated, the overlap reduces the frequency the pointer 14 is required to bounce between the first and second scales 22 and 30.

It is appreciated however, that these ranges are merely exemplary. As such, the first mode may define operation of the pointer 14 through a first scale of numbers having a different range. For example, the first scale of numbers may range from 0 to 50 MPH. Alternatively, ranges may define lower or higher MPH limits for the first mode. Similarly, the second mode may define operation of the pointer 14 through a second scale of numbers having a different range than shown in FIG. 1. For example, the second scale of numbers may range from 50 MPH to 120 MPH. Again, ranges may define lower or higher MPH limits for the second mode.

In general, the pointer 14 is operable to rotate clockwise around the dial 20 through the first mode while corresponding to the first scale of numbers 22. In one example, the first scale of numbers 22 may be illuminated by the first series of light sources 66 during operation in the first mode. During operation in the first mode, the second series of light sources 72 are not illuminated. As a result, the second scale of numbers 30 is generally non-identifiable during operation in the first mode. Once the speed of the vehicle exceeds a limit of the first scale of numbers 22, the motor 50 quickly advances the pointer 14 to a position corresponding to a beginning of the second scale of numbers 30. In the example shown, once vehicle speed surpasses 90 MPH (break point), the pointer 14 quickly is advanced by the motor 50 to a position corresponding to 90 MPH on the second scale of numbers 30. In one example, the pointer 14 may be quickly advanced in a clockwise direction to the beginning of the second scale of numbers 30. Alternatively, the pointer 14 may return to the beginning of the second scale of numbers 30 by rotating counter-clockwise. At this time, the second scale of numbers may be illuminated by the second series of light sources 72. During operation in the second mode, the first series of light sources 66 are not illuminated. As a result, the first scale of numbers 22 is generally non-identifiable during operation in the second mode. Because of the overlap described above, the pointer 14 would return to operation in the first mode (first scale of numbers 22) when vehicle speed drops below 80 MPH.

Figure 3:
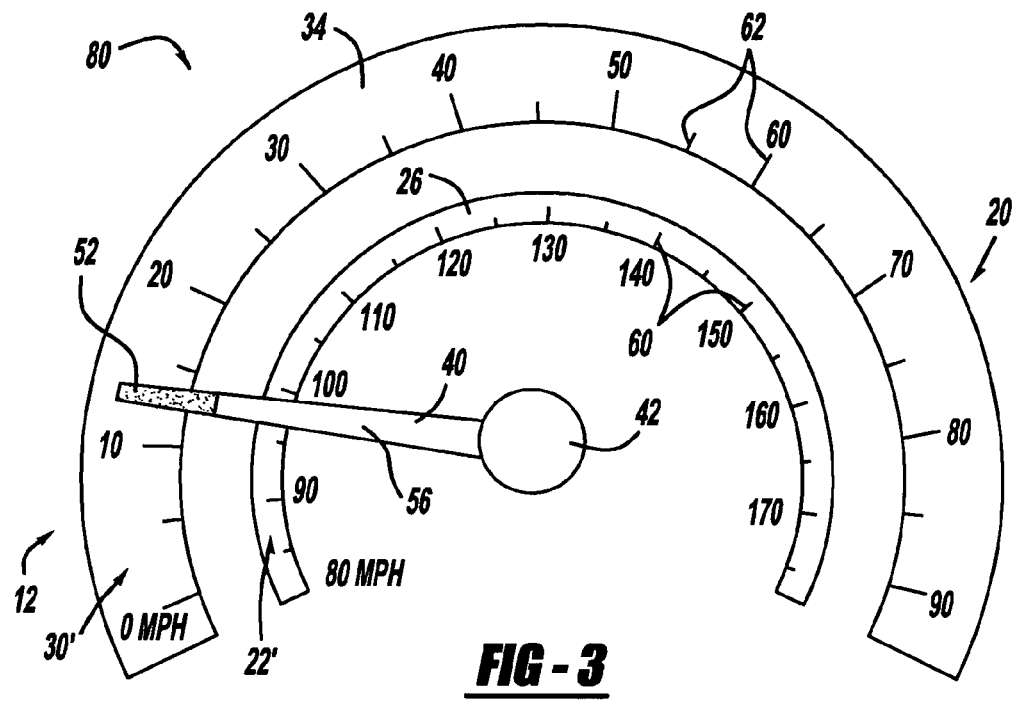
FIG. 3 is a front view of an exemplary vehicle speedometer in accordance with a second aspect of the present teachings.

With reference now to FIG. 3, a gauge 80 constructed in accordance to additional features will be described. For illustrative purposes, like components will be referred to with like reference numerals. The gauge 80 is similar to the gauge 12 except the locations of the first and second scales of numbers 22 and 30 are reversed. Explained further, the first scale of numbers 22 are located radially outboard relative to the second scale of numbers 30. The functionality of the gauge 80 is similar to that described with respect to gauge 12. In one example, only the first scale of numbers 22 are illuminated during operation in the first mode while only the second scale of numbers 30 are illuminated during operation in the second mode.

Figure 4:
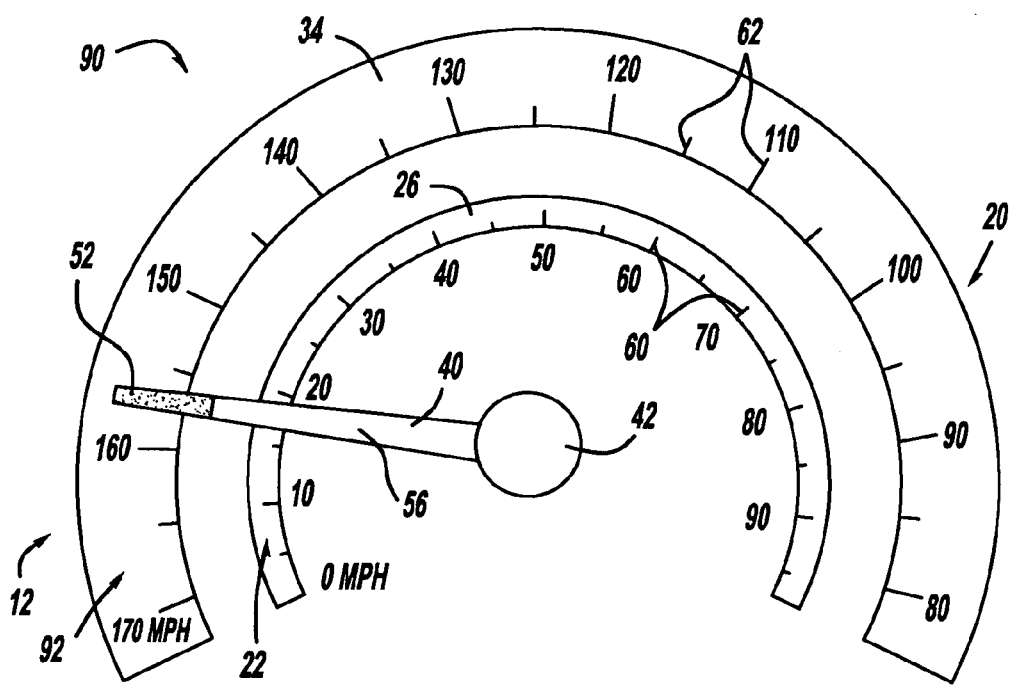
FIG. 4 is a front view of an exemplary vehicle speedometer in accordance with a third aspect of the present invention.

Turning now to FIG. 4, a gauge 90 constructed in accordance to additional features will be described. Again, for illustrative purposes, like components will be referred to with like reference numerals. The gauge 90 is similar to the gauge 12 illustrated in FIG. 1 however, a second scale of numbers 92 provides numerals in a reverse sequence. Specifically, the second scale of numbers 92 increase in a counterclockwise direction around the dial 20. While the first range of numerals 22 are depicted inboard of the second range of numerals 92, it is appreciated that they may be reversed.

Operation of the gauge 90 will now be described. The pointer 14 is operable to rotate around the dial 20 through the first mode while corresponding to the first scale of numbers 22. In one example, the first scale of numbers 22 may be illuminated by the first series of light sources 66 during operation in the first mode. Once the speed of the vehicle exceeds a limit of the first scale of numbers 22, the pointer 14 begins to rotate in a counterclockwise direction. At this time, the second scale of numbers 92 may be illuminated by the second series of light sources 72 while the first series of light sources 66 are not illuminated.

While the invention has been described in the specification and illustrated in the drawings with reference to various embodiments, it will be understood by those skilled in the art that various changes may be made and equivalents may be substituted for elements thereof without departing from the scope of the invention as defined in the claims. For example, while the drawings and related discussion are specifically directed toward a radial dial, the same may be applied to a scale of numbers arranged in another pattern, such as linear. In addition, while the specific examples relate to a pair of scales of numbers, more scales may be provided. In this way, three or more radially offset scales of numerals may be arranged on the dial. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A gauge of a vehicle instrument cluster for measuring vehicle speed, comprising:
    a dial;
    a pointer rotatably mounted in the instrument cluster and movable to a plurality of positions relative to the dial;
    a first scale of numbers having a first starting point and arranged sequentially around the dial and corresponding to a first range of vehicle speeds; and
    a second scale of numbers having a second starting point and arranged sequentially around the dial and corresponding to a second range of vehicle speeds, faster than the first range of speeds and having like units, wherein the first scale and second scale of numbers are arranged in a radially offset relation, and wherein when the vehicle speed exceeds the first range of vehicle speeds on the first scale of numbers, the pointer moves to the second starting point on the second scale of numbers.

2. The gauge of claim 1 wherein the pointer is adapted to rotate from a first position corresponding to the first starting point on the first scale of numbers to a position corresponding to a break point at an end of the first scale of numbers and wherein when the vehicle speed exceeds the break point, the pointer is adapted to rotate to the first position corresponding to the second starting point on the second scale of numbers.

3. The gauge of claim 2, further comprising a motor adapted to advance the pointer from the break point to the first position.

4. The gauge of claim 2 wherein the first scale of numbers are inboard the second scale of numbers.

5. The gauge of claim 4 wherein the first scale of numbers is illuminated when the vehicle speed is within the first range of speeds.

6. The gauge of claim 5 wherein the second scale of numbers is illuminated when the speed is within the second range of speeds.

7. The gauge of claim 6 wherein the second scale of numbers is unidentifiable when the speed is within the first range of speeds and wherein the first scale of numbers is unidentifiable when the speed is within the second range of speeds.

8. The gauge of claim 1 wherein the second scale of numbers is arranged sequentially counterclockwise around the dial.

9. The gauge of claim 8 wherein the pointer is adapted to rotate in a clockwise direction from a first position corresponding to the first starting point on the first scale of numbers to a position corresponding to a break point at an end of the first scale of numbers and wherein when the speed exceeds the break point, the pointer is adapted to rotate in a counterclockwise direction from the break point corresponding to the second starting point on the second scale of numbers.

10. A gauge of a vehicle instrument cluster for measuring vehicle speed, comprising:
    a dial;
    a first scale of numbers arranged sequentially around the dial and corresponding to a first range of speeds;
    a second scale of numbers arranged sequentially around the dial and corresponding to a second range of speeds, the second scale of numbers radially offset from the first scale of numbers; and
    a pointer rotatably mounted in the instrument cluster and adapted to rotate from a first position corresponding to a first starting point on the first scale of numbers to a position corresponding to a break point at an end of the first scale of numbers and wherein when the speed exceeds the break point, the pointer is adapted to return to the first position corresponding to a second starting point on the second scale of numbers.

11. The gauge of claim 10 wherein the first and second scale of numbers define like units.

12. The gauge of claim 11, further comprising a motor adapted to advance the pointer from the break point to the first position.

13. The gauge of claim 11 wherein the first scale of numbers is illuminated when the speed is within the first range of speeds.

14. The gauge of claim 13 wherein the second scale of numbers is illuminated when the speed is within the second range of speeds.

15. The gauge of claim 14 wherein the second scale of numbers is unidentifiable when the speed is within the first range of speeds and wherein the first scale of numbers is unidentifiable when the speed is within the second range of speeds.

16. The gauge of claim 10 wherein the second scale of numbers is arranged sequentially counterclockwise around the dial.

17. The gauge of claim 16 wherein the pointer is adapted to rotate in a clockwise direction from a first position corresponding to a first starting point on the first scale of numbers to a position corresponding to a break point at an end of the first scale of numbers and wherein when the speed exceeds the break point, the pointer is adapted to rotate in a counterclockwise direction from the break point corresponding to a second starting point on the second scale of numbers.

18. A gauge of a vehicle instrument cluster speed measuring gauge, comprising:
    a dial;
    a first scale of numbers arranged sequentially around the dial and corresponding to a first range of vehicle speeds in a first mode;
    a second scale of numbers arranged sequentially around the dial and corresponding to a second range of vehicle speeds having like units, in a second mode, the second scale of numbers radially offset from the first scale of numbers; and
    a pointer rotatably mounted in the instrument cluster and adapted to rotate around the dial in the first mode and the second mode, wherein the first scale of numbers is illuminated in the first mode and unilluminated in the second mode and wherein the second scale of numbers is illuminated in the second mode and unilluminated in the first mode.

19. The gauge of claim 18 wherein the pointer is moveable from a first position corresponding to a first starting point on the first scale of numbers to a position corresponding to a break point at an end of the first scale of numbers and wherein when the speed exceeds the break point, the pointer is adapted to return to the first position corresponding to a second starting point on the second scale of numbers.

20. The gauge of claim 19, further comprising a motor adapted to advance the pointer from the break point to the first position.

* * * * *